United States Patent

[11] 3,581,711

[72] Inventor Marcus L. Bates
 6904 N. Russell Ave., Odessa, Tex. 79760
[21] Appl. No. 831,600
[22] Filed June 9, 1969
[45] Patented June 1, 1971

[54] AUTOMATIC FEEDING AND WATERING APPARATUS
 6 Claims, 7 Drawing Figs.
[52] U.S. Cl. .................................................. 119/51.5, 119/56
[51] Int. Cl. .................................................. A01k 05/00, A01k 07/00
[50] Field of Search ........................................ 119/51.5, 51.13, 15.14, 56

[56] References Cited
UNITED STATES PATENTS
1,207,938  12/1916  Kuxmann ..................... 119/51.5
1,219,114  3/1917  Lappas ......................... 119/51.5

Primary Examiner—Hugh R. Chamblee
Attorney—Marcus L. Bates

ABSTRACT: An automatic feeding and watering apparatus having a main housing within which there is disposed a plurality of pivotally mounted upwardly opening spaced apart enclosures, with each enclosure including a food containing chamber and a water containing chamber therein. Overlying the chambers there is disposed a water conveying means comprised of individual sloped troughs, each arranged in series relationship so as to intercept and convey water from a first enclosure to a last enclosure, whereupon the water fills the water chamber thereof causing the last enclosure to rotatably invert, thereby depositing the water and food contained therein into a food receptacle or feeding trough. Each of the enclosure means is sequentially inverted in a similar manner.

PATENTED JUN 1 1971     3,581,711
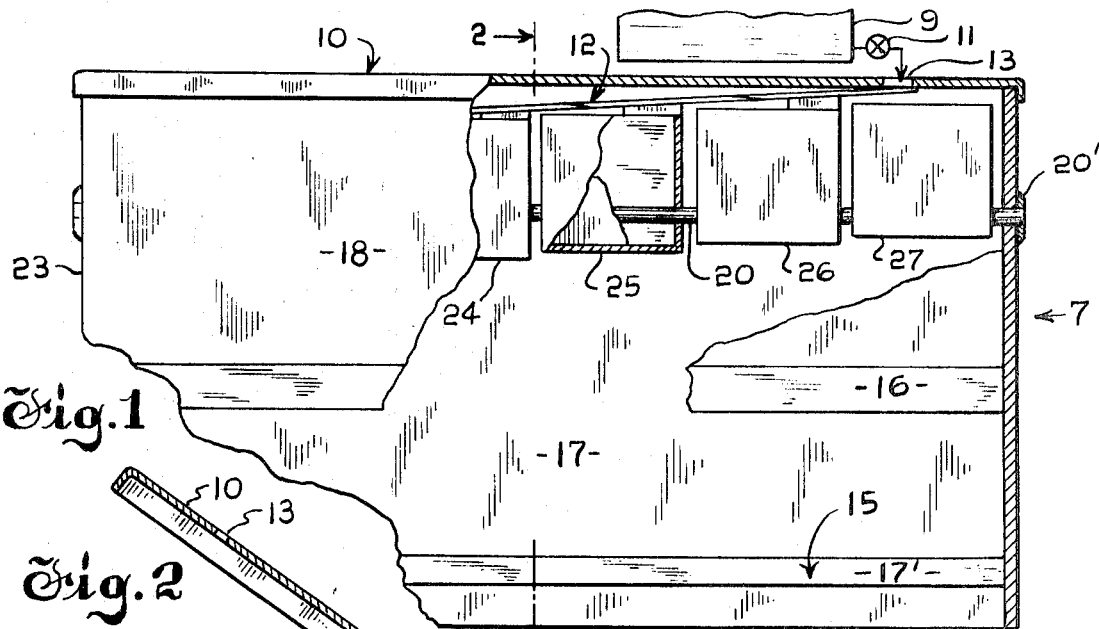
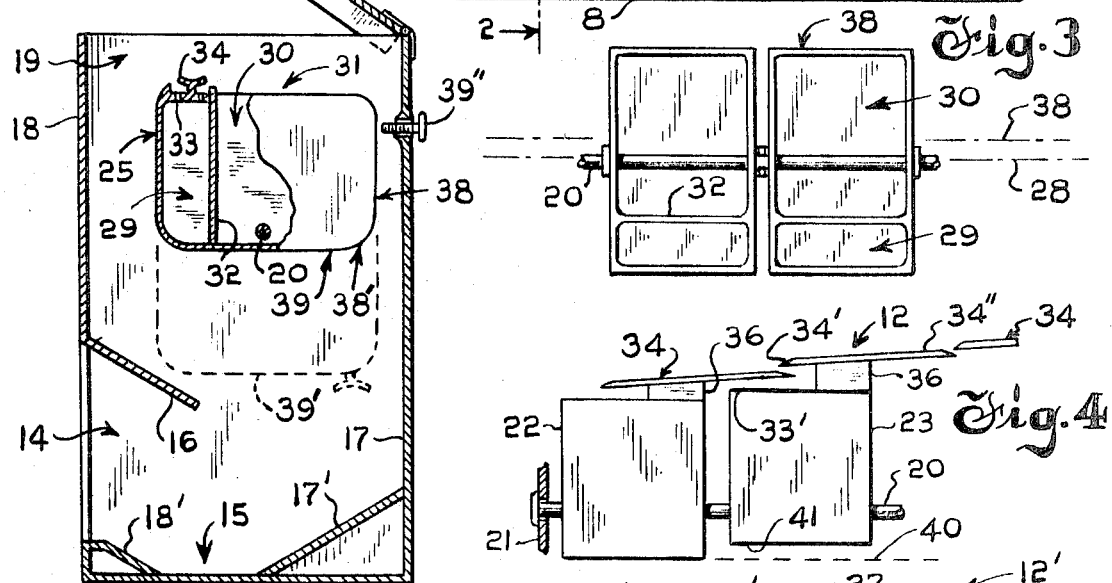
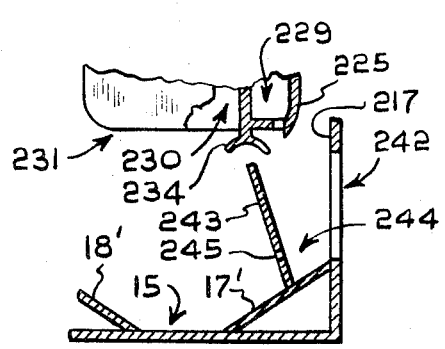
INVENTOR
Marcus L Bates

AUTOMATIC FEEDING AND WATERING APPARATUS

BACKGROUND OF THE INVENTION

Ownership of animals, especially domesticated animals such as dogs and cats, imposes a duty upon the owner to see that the pets are cared for and fed at least one time a day. Young animals must be fed several times a day. Pets are often neglected because their owners forget to feed them. At times pets become an extreme inconvenience and liability for the reason that they must be boarded or otherwise imposed upon a third party when their masters are absent from home a length of time which exceeds a day. It is therefore desirable for one to be able to automatically feed pets for several consecutive days in a reliable and punctual manner.

SUMMARY OF THE INVENTION

This invention provides for improvements in an automatic feeding and watering apparatus having a main housing within which there is disposed a multiplicity of pivotally mounted enclosures. Each enclosure has a food containing chamber and a water containing chamber formed therein. A sloped trough associated with each enclosure means, save the first, cooperates with each other so as to provide a water conveying means to the last enclosure of the series. Each enclosure means is pivoted from an upright to an inverted position when the center of gravity thereof is shifted because of an accumulation of water within the water chamber thereof. Accordingly, a metered supply of water is received by the water conveying means and transported to the last of the enclosure means, thereby filling the water chamber thereof, whereupon the enclosure means inverts and the food and water contained therein is deposited into a feeding trough or a feeding and a watering trough located within the main housing. This action causes the water conveying trough of the next adjacent enclosure means to communicate with the commence filling the water chamber thereof with water, and upon the water chamber becoming at least partially filled, this enclosure is also cause to invert so as to enable the water chamber of the next adjacent enclosure means to commence to be filled. This action continues in a sequential manner until each of the enclosure means has been inverted, thus depositing the food and water therefrom into the feeding trough at predetermined, spaced apart, timed intervals.

It is therefore a primary object of the present invention to provide an automatic animal feeding apparatus which is actuated by a controlled flow of water.

Another object of the present invention is the provision of watering and feeding apparatus which is actuated upon a water chamber associated therewith becoming at least partially filled with water.

Still another object of the present invention is the provision of an enclosure means which can be inverted when its center of gravity is shifted a predetermined amount due to water being collected therein.

A still further object of the present invention is the provision of automatic feeding and water apparatus which includes a plurality of spaced apart enclosure means having a food containing chamber, a water containing chamber, and which can be pivotally inverted due to the center of gravity thereof being progressively shifted to a predetermined location.

The above objects are attained in accordance with the present invention by the provision of apparatus fabricated in accordance with the foregoing abstract and summary. Other objects of the present invention will become apparent to those skilled in the art as the remainder of the present disclosure is digested.

BRIEF DESCRIPTION OF THE DRAWINGS

FIG. 1 is a partial front elevational view with some parts thereof being broken away and removed in order to show the interior thereof, and with some of the remaining parts being shown in section;

FIG. 2 is a cross-sectional view taken along line 2-2 of FIG. 1, with some additional parts being illustrated therein;

FIG. 3 is a partial top view of part of the apparatus as seen in FIGS. 1 and 2;

FIG. 4 is a partial front view of a portion of the apparatus seen in FIGS. 1 through 3;

FIG. 5 sets forth a modification of FIG. 4;

FIG. 6 is a partial cross-sectional view which sets forth a modification of FIGS. 1 through 4; and FIG. 7 is a modification of part of the apparatus seen in FIGS. 4 and 5.

DETAILED DESCRIPTION OF THE PREFERRED EMBODIMENTS

FIG. 1 discloses an automatic feeding and watering apparatus for feeding animals, and includes a main housing 7 which is bottom supported by a base 8 with a water supply 9 being disposed above closure member 10. Valve 11 meters a predetermined quantity of water into water conveying means 12 with the water preferably freely flowing through flow passageway 13.

As best illustrated in FIG. 2 in conjunction with FIG. 1, a feeding entrance 14 is longitudinally disposed across the lower front of the main housing and communicates with feeding trough 15. Inwardly and downwardly sloped member 16 overlies the entrance.

Rear wall 17 has sloped member 17' attached thereto and forms a portion of the feeding trough. Front wall 18, which may be a continuation of member 16, cooperates with the remaining structure to form an opening 19 into the upper portion of the apparatus.

Suitably attached to each of the end walls of the main housing is a shaft 20 which rotatably supports a plurality of spaced apart upwardly opening enclosure members 22, 23, 24, 25, 26, and 27. It should be understood that although there are six illustrated enclosure members, that there could be as few enclosure members as considered practical while still remaining within the teachings of the present invention. Each enclosure member includes a water containing chamber 29 and a food containing chamber 30 having opening 31, with the two chambers being separated from one another by the illustrated vertical bulkhead 32. The water containing chamber has a perforated or apertured member 33 disposed thereabove and forms the lowermost portion of a water collecting depression, with the member 33 additionally supporting a sloped water trough 34. The water trough of each enclosure forms a portion of the before mentioned water conveying means.

As particularly seen in FIG. 4, the sloped trough is formed with a lowermost end portion 34' and an uppermost end portion 34", with the trough being attached to the water chamber by web 36. The uppermost marginal depending end portion of one sloped trough underlies the lowermost marginal depending end portion of the next adjacent sloped trough, except for the last enclosure member 22 which, of course, forms the end of the water conveying means, and except for the first enclosure member 27 which is aligned with the flow passageway 13 located directly above the water chamber thereof. As seen in FIG. 5, web members 36 may be of various adjusted height so as to enable proper relative elevation of the plurality of sloped troughs. Furthermore, as seen in FIG. 4, the bottom 40, 41 of adjacent enclosure members may be offset by locating shaft 20 at different elevations therethrough if deemed desirable.

Looking now to the details of FIG. 6, wherein similar numerals relate to similar elements, the enclosure member is seen to be in the inverted position. The sloped water trough 234 is seen to be an extension of the bulkhead which separates the water chamber from the food chamber. Underlying the sloped water trough is a longitudinally extending wall member 243 having aperture 245 formed therein with the wall members 217, 17', and 243 forming a drinking trough at 244. Drinking entrance 242 enables access to the water contained within the drinking trough.

As seen in FIG. 7, the sloped water conveying troughs may be in the form of tubular members having a lowermost end portion 137' which overlies the enlarged uppermost water inlet portion 130 with the adjacent ends being in overlying relationship as seen at 137.

OPERATION

In operation, the closure member 10 is pivoted away from opening 19 so as to enable each of the spaced apart enclosure members to be returned to their normal upright position in a manner as disclosed in FIGS. 1 and 2. The dog food is deposited into the food chamber 30 through inlet 31, with rear wall 38 of each food chamber resting against screw adjustment 39''. With each food chamber in the upright position, the sloped troughs form a continuous water conveying means as seen at 12 in FIG. 1, with the depending end portions of each individual trough overlapping the other in the manner of FIGS. 4, 5, and 7. The water supply 9, if desired, can form a portion of the closure means 10. With valve 11 opened a predetermined amount, water drips or otherwise flows through aperture 13 where it is intercepted by the first water trough and prevented from entering the water chamber of enclosure 27 because of the presence of the sloped trough associated with enclosure member 26. Accordingly, water is transferred from 11 along the water conveying means where it is flow conducted into the water chamber of the last enclosure means 22. As the water chamber of 22 at least partially fills with water, the center of gravity of the enclosure is shifted towards the front of the main housing whereupon the enclosure means rotates about rod 20 and into the inverted position indicated by numeral 39'. This action causes food from chamber 30 along with the water from chamber 29 to be deposited into the feeding trough where the dry food absorbs the water, rendering the food more appetizing to the animal. As the enclosure means is inverted, the sloped trough 34 is carried therewith, thereby positioning or leaving the next adjacent sloped trough in overlying relationship with respect to its associated water chamber, whereupon the water supply is now metered thereinto. Accordingly, each enclosure member sequentially fills with water and inverts, thereby leaving the next adjacent upright chamber to begin filling with water so as to ultimately shift the center of gravity and cause it to invert along with all the other inverted enclosure members. As the next to the last enclosure member 26 moves to the inverted position, water which is dripping through flow passageway 13 is directly conveyed into its water chamber, causing it to eventually attain an inverted position. Hence each enclosure member is inverted, causing water and food to be transferred into the feeding trough in response to the water flow rate.

As seen in FIGS. 4 and 5, the bottommost portion of adjacent enclosure means, illustrated at 40, 41, can be offset by arranging the location of shaft 20 with respect thereto. Alternatively, the proper slope of the water conveying means can be attained by changing the width of one member 36' with respect to another as indicated at 35'. Alternatively, where a large number of enclosure members are required, advantage can be taken of both these expedients as seen in FIG. 4.

As seen in FIG. 6, the water and food may be maintained separate from one another by the provision of bulkhead 243. As each enclosure member is inverted, the trough 234 cooperates with bulkhead 243 to cause water to flow from water chamber 229 and into drinking trough 244 while the food is deposited into the feeding trough. Aperture 245 permits water from the drinking trough to overflow into the feeding trough should excess water be accumulated in the drinking trough, otherwise bulkhead 243 maintains the food and water troughs separate from each other.

In arid regions of low humidity, it is sometime advantageous to decrease the water evaporation loss by the provision of tubular sloped members as seen in FIG. 7. Water flow occurs through the tubular members by following a flow path defined by the entrance 130, through the tubular member 134, where the water then falls from the lowermost end of one sloped tubular member into the entrance formed at the uppermost end of another sloped member.

It is economically advantageous to mold a single enclosure member having a vertical reinforcement along each sidewall to enable shaft 20 to be received by an aperture which is formed at various elevations along the reinforcement. This expedient enables a single-type enclosure member to be slightly modified and used at 22—27. The water troughs likewise may be fabricated from a single mold by cutting the length of web 36 to provide the desired height thereof with the web being affixed to either the common wall 32 or the perforated member 33 by any desired means including cementing. The enclosure members may alternatively be individually journaled to the rear wall, if desired.

The shaft 20 can be located along dot-dash line 28 or 38, depending upon the amount of water deemed desirable to unbalance and pivot the enclosure member. The rod must be received by the enclosure member at an elevation, generally located well below the geometrical center, which will cause the member to invert prior to the water chamber becoming completely filled. Various configurations of enclosure members require different shaft mounting locations, the optimum being readily determined by either calculation or trial and error.

It will now be obvious to those skilled in the art that the outer peripheral surface of each enclosure member must be positioned with respect to wall members 16, 17, and 18 whereby ample clearance is provided to allow rotation of the enclosure members.

It should be understood that the number of enclosure members can be varied in accordance with the feeding habits of the animal which will use the apparatus. With the average dog, for example, a feeding unit having five enclosure members enables the animal to be safely left alone for more than 72 hours, assuming a feeding cycle based on 12 hour intervals.

Where deemed desirable, means for causing various audible signals or sounds can be incorporated into the apparatus whereby actuation of each of the enclosure members to the inverted position is accompanied by a noise which informs the pet that the next meal has been served by the apparatus.

I claim:

1. Animal feeding apparatus having means forming a plurality of spaced apart enclosure members;
    means pivotally mounting said enclosure members to enable said enclosure members to assume an upright position and to be rotated into an inverted position;
    means forming a feeding trough, said feeding trough being disposed in underlying relationship with respect to said enclosure members when said members are inverted;
    means forming a water containing chamber and a food containing chamber within said enclosure member, said food and water containing chambers adapted to discharge food and water which may be contained therein therefrom when rotated into an inverted position;
    said water containing chamber being located in a position with respect to said means pivotally mounting said enclosure member to cause said enclosure member to rotate into the inverted position when said water containing chamber becomes at least partially filled with water; and
    a water conveying means for transferring water from a suitable source of water into the water containing chamber of an enclosure member to thereby cause an enclosure member to rotate into the inverted position.

2. The apparatus of claim 1 wherein said water conveying means includes a sloped trough attached to one said enclosure member, said sloped trough having upper and lower depending end portions, the lower depending end portion of said sloped trough being arranged above the water chamber of the enclosure member thereof; a second sloped trough attached to an adjacent enclosure member with the lower depending end of said second trough being arranged above the upper depending end of the first recited sloped trough, whereby water conveyed along the second sloped trough flows into the first sloped trough to thereby supply the water chamber of the enclosure chamber thereof with a sufficient quantity of water to cause the enclosure means to invert, whereupon water is then conveyed by said second sloped trough into the water chamber to which said second sloped trough is connected.

3. The apparatus of claim 2, and further including means forming a drinking trough disposed in spaced apart relationship with respect to said feeding trough;

means by which a bulkhead is arranged between said feeding trough and said drinking trough, said bulkhead being located in underlying relationship with respect to said sloped trough when said enclosure is rotated to the inverted position; whereby:

when said enclosure member is inverted, food is transferred into said feeding trough while water is transferred into said water trough.

4. The apparatus of claim 1, wherein said plurality of enclosure members are arranged in said spaced apart relationship and adjacent to each other;

means by which a first of said enclosure members has the water chamber thereof underlying the source of water so that water can flow from the source and into the water chamber of said first enclosure member;

a second of said enclosure members being adjacent to said first of said enclosure members and further including a last of said enclosure members;

said second and last said enclosure members each having a water conveying trough affixed thereto and forming at least part of said water conveying means, with each said water trough having a lower depending end portion and an upper depending end portion, said lower depending end portion of each water trough being positioned in overlying relationship with respect to said water chamber of said enclosure member to which said water trough is affixed;

the upper end of the last water trough underlying the lower end of the next adjacent water trough, said second water trough having an upper end which intercepts the water flow to the first enclosure; whereby:

water flows into the first water trough where it is conveyed to the last enclosure by the joint action of the water troughs located therebetween.

5. The apparatus of claim 1 wherein said plurality of enclosure means includes a first and second enclosure means, said water conveying means includes an inlet flow passageway which overlies said water chamber of said first enclosure means adapted to transport water into the last said water chamber;

said water conveying means further including a sloped trough having a lower end portion which is flow connected to the water chamber of said second enclosure means, with said sloped trough having an upper end portion which intercepts the flow of water to the water chamber of the first enclosure means when the first and second enclosures are in the upright position.

6. The apparatus claim 5, and further including still another enclosure member having a sloped trough, said sloped trough having an upper end portion which underlies the lower end portion of said sloped trough of said second enclosure member, whereby;

water can be flow conducted from the source, along each of the individual sloped troughs and into the water chamber of the still another enclosure member to cause the last said enclosure member to invert, whereupon the water chamber of said second enclosure means fills with water, inverts, thereby enabling the water chamber of the first enclosure means to fill with water and invert.